US011719590B2

(12) United States Patent
Coombs (10) Patent No.: US 11,719,590 B2
(45) Date of Patent: Aug. 8, 2023

(54) WELD TEST PLUGS AND METHODS OF USE

(71) Applicant: CLEARWATER PIPE RENTALS INC., Meadow Lake (CA)

(72) Inventor: Josh Coombs, Fort Saskatchewan (CA)

(73) Assignee: CLEARWATER PIPE RENTALS INC., Fort Saskatchewan (CA)

( * ) Notice: Subject to any disclaimer, the term of this patent is extended or adjusted under 35 U.S.C. 154(b) by 262 days.

(21) Appl. No.: 17/257,577

(22) PCT Filed: Jul. 19, 2019

(86) PCT No.: PCT/CA2019/051005
§ 371 (c)(1),
(2) Date: Jan. 3, 2021

(87) PCT Pub. No.: WO2020/014794
PCT Pub. Date: Jan. 23, 2020

(65) Prior Publication Data
US 2021/0255054 A1  Aug. 19, 2021

(30) Foreign Application Priority Data
Jul. 20, 2018 (CA) .................................. CA 3012098

(51) Int. Cl.
*G01M 3/02* (2006.01)
*G01M 3/28* (2006.01)
(Continued)

(52) U.S. Cl.
CPC .......... *G01M 3/022* (2013.01); *G01M 3/2815* (2013.01); *G01N 3/12* (2013.01); *G01N 2203/0296* (2013.01)

(58) Field of Classification Search
CPC ........... F16L 55/10; G01M 3/00; G01M 3/02; G01M 3/022; G01M 3/12; G01M 3/28; G01M 3/2815; G01N 2203/0296
See application file for complete search history.

(56) References Cited

U.S. PATENT DOCUMENTS 3,483,894 A   12/1969   Finocchiaro
4,381,800 A    5/1983   Leslie
(Continued)

FOREIGN PATENT DOCUMENTS

CA   1147441   5/1983
CA   1163696   3/1984
(Continued)

OTHER PUBLICATIONS

KLM Technology Group, Hydrostatic pressure testing of piping (project standards and specifications), available as early as Jul. 2011, 7 pages.
(Continued)

*Primary Examiner* — Nguyen Q. Ha
(74) *Attorney, Agent, or Firm* — Robert A. Nissen (57) ABSTRACT

A weld test plug has a flange; an actuator rod mounted to the flange, the actuator rod having: a part expander; an annular seal; and an axial stop; in which the actuator rod is connected to, during use, cause the part expander to actuate: the axial stop to move in a radially outward direction relative to the actuator rod; and the annular seal to radially expand and abut the axial stop. A method includes inserting an actuator rod into an open end of a vessel, the actuator rod carrying an annular seal, and an axial stop; sealing the open end of the vessel around the actuator rod; operating the actuator rod to actuate: the axial stop to move in a radially outward direction relative to the actuator rod; and the annular seal to
(Continued)

radially expand to abut the axial stop and seal against an inner circumferential surface of the vessel.

25 Claims, 4 Drawing Sheets

(51) Int. Cl.
*F16L 55/10* (2006.01)
*G01N 3/12* (2006.01)

(56) References Cited

U.S. PATENT DOCUMENTS

| | | | |
|---|---|---|---|
| 4,393,564 | A | 7/1983 | Martin |
| 4,425,943 | A | 1/1984 | Martin |
| 4,436,117 | A | 3/1984 | Martin |
| 4,813,817 | A | 3/1989 | Junier |
| 5,038,830 | A | 8/1991 | Arnaud |
| D322,129 | S | 12/1991 | Matsumoto |
| 5,167,064 | A | 12/1992 | Sutor, IV |
| 5,437,310 | A | 8/1995 | Cunningham |
| 5,676,174 | A | 10/1997 | Berneski, Jr. |
| 5,797,431 | A | 8/1998 | Adams |
| 5,975,142 | A | 11/1999 | Wilson |
| 6,131,441 | A | 10/2000 | Berube |
| 6,367,313 | B1 * | 4/2002 | Lubyk .............. G01M 3/022 138/90 |
| 6,494,465 | B1 | 12/2002 | Bucknell |
| 6,512,525 | B1 | 1/2003 | Capps |
| 6,675,634 | B2 | 1/2004 | Berneski, Jr. |
| 6,892,748 | B2 | 5/2005 | Junier |
| 6,989,081 | B2 | 1/2006 | Lah |
| 7,137,308 | B2 | 11/2006 | Harris |
| 7,530,574 | B2 | 5/2009 | Lah |
| 7,578,907 | B2 | 8/2009 | Lah |
| 7,958,992 | B1 | 6/2011 | Stier |
| 8,333,219 | B2 | 12/2012 | Holstad |
| 9,664,588 | B2 | 6/2017 | Kotlyar |
| 9,823,155 | B2 | 11/2017 | Sarkissian |
| 10,488,295 | B2 | 11/2019 | Sarkissian |
| 2003/0167827 | A1 | 9/2003 | Berneski |
| 2010/0083738 | A1 | 4/2010 | Padden |
| 2015/0369689 | A1 | 12/2015 | Kotlyar |
| 2017/0052086 | A1 | 2/2017 | Sarkissian |

FOREIGN PATENT DOCUMENTS

| | | | |
|---|---|---|---|
| CA | 2345335 C | * 11/2008 | ............ G01M 3/022 |
| CA | 2685874 | 12/2008 | |
| CN | 202362215 U | 8/2012 | |
| CN | 203069465 U | 7/2013 | |
| CN | 107271262 A | 10/2017 | |
| CN | 106122672 B | * 8/2018 | ............ F16L 55/134 |
| EP | 2691682 | 6/2016 | |
| JP | 4721818 | 7/2011 | |
| RU | 10828 | 8/1999 | |
| WO | 9623204 | 8/1996 | |
| WO | 0003172 | 1/2000 | |

OTHER PUBLICATIONS

Slac National Accelerator Laboratory, Chapter 14: Pressure Systems, published Dec. 9, 2015, 7 pages, URL=https://www-group.slac.stanford.edu/esh/eshmanual/references/pressureProcedTest.pdf.
Curtiss-Wright, Safely Isolate, Weld, and Test Flange to Pipe Connections in Minutes, available as early as Mar. 2017, 2 pages.
Pembina, Hydrostatic Testing Procedures for Facilities, available as early as Jun. 14, 2011, 17 pages.
Patent Cooperation Treaty, Notification of Transmittal of the International Search Report and the Written Opinion of the International Searching Authority, or the Declaration, dated Sep. 19, 2019, 7 pages.
PNR Engineering Systems PTE Ltd, High Lift Flange Weld Test Plug, Screenshots from a youtube video, available as early as Apr. 25, 2017, 2 pages, URL = https://www.youtube.com/watch?v=qL4V7fsCyj0.
European Patent Office, Supplementary Partial European Search Report for the corresponding European patent application, dated Jul. 8, 2022, 14 pages.
Machine generated translation of NPL2—RU10828, obtained Oct. 17, 2022, 5 pages.
Examiner's report of the corresponding Canadian patent application No. 3,147,780, dated Jan. 27, 2023, 4 pages.

* cited by examiner

WELD TEST PLUGS AND METHODS OF USE

TECHNICAL FIELD

This document relates to weld test plugs for vessels, such as valves and pipes, as well as methods of use of same.

BACKGROUND

Weld test plugs are used to isolate a section of piping that has been welded, in order to perform hydrostatic testing on the section to check the integrity of the weld.

SUMMARY

A weld test plug is disclosed comprising: a flange; an actuator rod mounted to the flange, the actuator rod having: a part expander; an annular seal; and an axial stop; in which the actuator rod is connected to, during use, cause the part expander to actuate: the axial stop to move in a radially outward direction relative to the actuator rod; and the annular seal to radially expand and abut the axial stop.

A method is disclosed comprising: inserting an actuator rod into an open end of a vessel, the actuator rod carrying an annular seal, and an axial stop; sealing the open end of the vessel around the actuator rod; operating the actuator rod to actuate: the axial stop to move in a radially outward direction relative to the actuator rod; and the annular seal to radially expand to abut the axial stop and seal against an inner circumferential surface of the vessel.

In various embodiments, there may be included any one or more of the following features: The part expander has a first axial portion that is structured to slide relative to and within the annular seal to radially expand the annular seal. The first axial portion forms a wedge that is tapered with decreasing radius in a direction toward the annular seal. The first axial portion is frustoconical in shape. The part expander has a second axial portion that is structured to slide relative to and within the axial stop to move the axial stop in the radially outward direction. The second axial portion is tapered with decreasing radius in a direction toward the axial stop. The second axial portion is frustoconical in shape. The part expander defines a stop flange that limits axial travel, relative to the part expander, of the axial stop during actuation. The stop flange is an annular surface. The part expander has a first axial portion that forms a first frustoconical wedge that slides within the annular seal and is tapered with decreasing radius from a base end of the first frustoconical wedge in a direction toward the annular seal. The part expander has a second axial portion that forms a second frustoconical wedge that slides within the axial stop and is tapered with decreasing radius from a base end of the second frustoconical wedge in a direction toward the axial stop. The base ends of the first and second frustoconical wedges are adjacent one another. A radius of the base end of the first frustoconical wedge is greater than a radius of the second frustoconical wedge to define a radially-facing annular stop flange, between the first and second frustoconical wedges, that faces the axial stop to restrict axial travel of the axial stop. The axial stop is structured to radially expand during actuation. The annular seal comprises elastomeric material. The axial stop comprises collet fingers. The collet fingers are biased to radially contract during resetting of the weld test plug. An annular gasket mounted to radially contract the collet fingers. The axial stop comprises metal. The annular seal defines a first end and a second end opposed to the first end. The annular seal is mounted such that during actuation the first end abuts the axial stop. The second end is mounted to a shaft that extends between the flange and the annular seal, with the actuator rod located within the shaft. The shaft defines a gripping part that grips the second end of the annular seal. The gripping part comprises barbed ridges. An outer part that compresses the second end of the annular seal against the gripping part. The flange defines a seal plane with a first side and a second side. An operator end of the actuator rod is on the first side. The part expander, the annular seal, the axial stop, and a testing end of the actuator rod are on the second side. The actuator rod is threaded to the flange or to a part located on the first side in order to permit rotation of the actuator rod to adjust an axial length of the actuator rod on the second side. Pressurizing fluid within a test zone defined within the vessel between the annular seal and the open end of the vessel. After pressurizing, operating the actuator rod to actuate the annular seal to radially contract and unseal from the inner circumferential surface of the vessel. After pressurizing, operating the actuator rod to actuate the axial stop and seal to radially contract.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

A pressure testing system may be used for hydrostatic pressure testing of a vessel, such as a pipe or tank, which is designed to retain or convey liquid or gas in use. Hydrotesting of pipes, pipelines and vessels is performed to expose defective materials that have missed prior detection, ensure that any remaining defects are insignificant enough to allow operation at design pressures, expose possible leaks and serve as a final validation of the integrity of the constructed system. ASME B31.3 requires this testing to ensure tightness and strength. Buried high pressure oil and gas pipelines may be tested for strength by pressurizing them to at least 125% of their maximum allowable working pressure (MAWP) at any point along their length. Since many long distance transmission pipelines are designed to have a steel hoop stress of 80% of specified minimum yield strength (SMYS) at Maximum allowable operating pressure MAOP, this means that the steel is stressed to SMYS and above during the testing, and test sections must be selected to ensure that excessive plastic deformation does not occur. Other codes require a more onerous approach. BS PD 8010-2 requires testing to 150% of the design pressure—which should not be less than the MAOP plus surge and other incidental effects that will occur during normal operation. Leak testing may be performed by balancing changes in the measured pressure in the test section against the theoretical pressure changes calculated from changes in the measured temperature of the test section. In the aerospace industry, depending on the airline, company or customer, certain codes will need to be followed. For example, Bell Helicopter has a certain specification that will have to be followed for any parts that will be used in their helicopters.

A hydrostatic pressure test may be carried out on a section or the entirety of a fluid system. If only a section of the system is desired to be tested, then a weld test plug may be used to isolate the section. A weld test plug may thus be used to isolate and check the integrity of a connection between adjacent hollow tubular parts, such connection having been made as part of a construction, upgrading, or repair of a fluid system.

Hydrostatic pressure testing a section of a vessel with a weld test plug has certain advantages over the testing of the entire fluid system or vessel. It may be that during construction, maintenance, or modification of a vessel, a valve fitting or other type of fitting made be added to a pipe system after pressure testing of the system has already been completed and passed. In such a case, only the connection to the new fitting, as opposed to the entire fluid system, may require pressure testing to confirm the integrity of the entire system. However, pressure testing poses considerable safety risks and is costly in both time and money. Thus, it may be preferable to isolate the section containing the new fitting with a weld test plug that is inserted into the end of a pipe near the fitting to create a fluid-tight seal against an inner periphery of a pipe and an outer seal between the weld test plug service flange and a pipe flange. This method of sectioning and pressure testing reduces the volume within the system that is sealed, thus minimizing safety risks, and decreasing the time and cost to conduct the pressure test.

A weld test plug may be used as follows to isolate and test a section of the vessel. The connection between parts in the vessel may be achieved by welding the parts together or by another suitable method, for example using adhesive or bolts. The weld test plug is used to isolate a particular section of the vessel containing the connection by sealing off portions of the vessel near to the connection. The weld test plug may be inserted through and sealed at a position proximal the open end of a section of a pipe, tube, or other vessel, and also sealed at a position distal to the open end to isolate a section that is in fluid communication with the connection between the parts. Sealing a section of pipe may also involve closing sectioning valves, and fixing blinds to the open ends of the test section if required. Next, the sealed section of the vessel may be pressurized with a fluid such as gas, including air or nitrogen, or a liquid such as a hydraulic fluid. The pressure inside the sealed section may be slowly increased to a pressure level suitable for the test and held at pressure for the duration of the inspection. While equipment is under pressure an operator inspects the equipment for leakages.

During operation of a weld test plug, a seal is inserted into the vessel and then selectively radially expanded outward at a suitable location in order to achieve a seal. In order to insert the seal into position, the seal must be in a neutral or contracted mode with a diameter that is smaller than or equal to the minimum inner diameter of the pipe at all points along the test section through which the seal is passed. Moreover, a mechanism must be provided to radially expand seal against the pipe wall. A weld test plug may use a deformable material, such as plastic to form a seal along the inner periphery of the pipe. The deformation of the material may be achieved by compressing the axial ends of the seal together in order to radially expand the seal against the pipe wall. In order to remove the seal from the vessel, the seal must be returned to a contracted state with a diameter that is smaller than or equal to the minimum inner diameter at all points along the test section through which the seal is passed.

The action of expanding and pressurizing the seal may make it difficult to remove the seal from the vessel after operation. The relatively high pressures applied to the seal during pressure testing can deform the seal in such a way that impairs the ability of the seal to function as the seal or to return to its initial diameter. In some cases a deformed seal may not return to its original minimum diameter, and may thus catch on parts of the inside of the pipe while attempting to remove the weld test plug from the vessel. In extreme cases the vessel may need to be disassembled or the vessel cut open in order to remove the damaged plug from the vessel.

Figures 4, 4A, 4B, 4C:
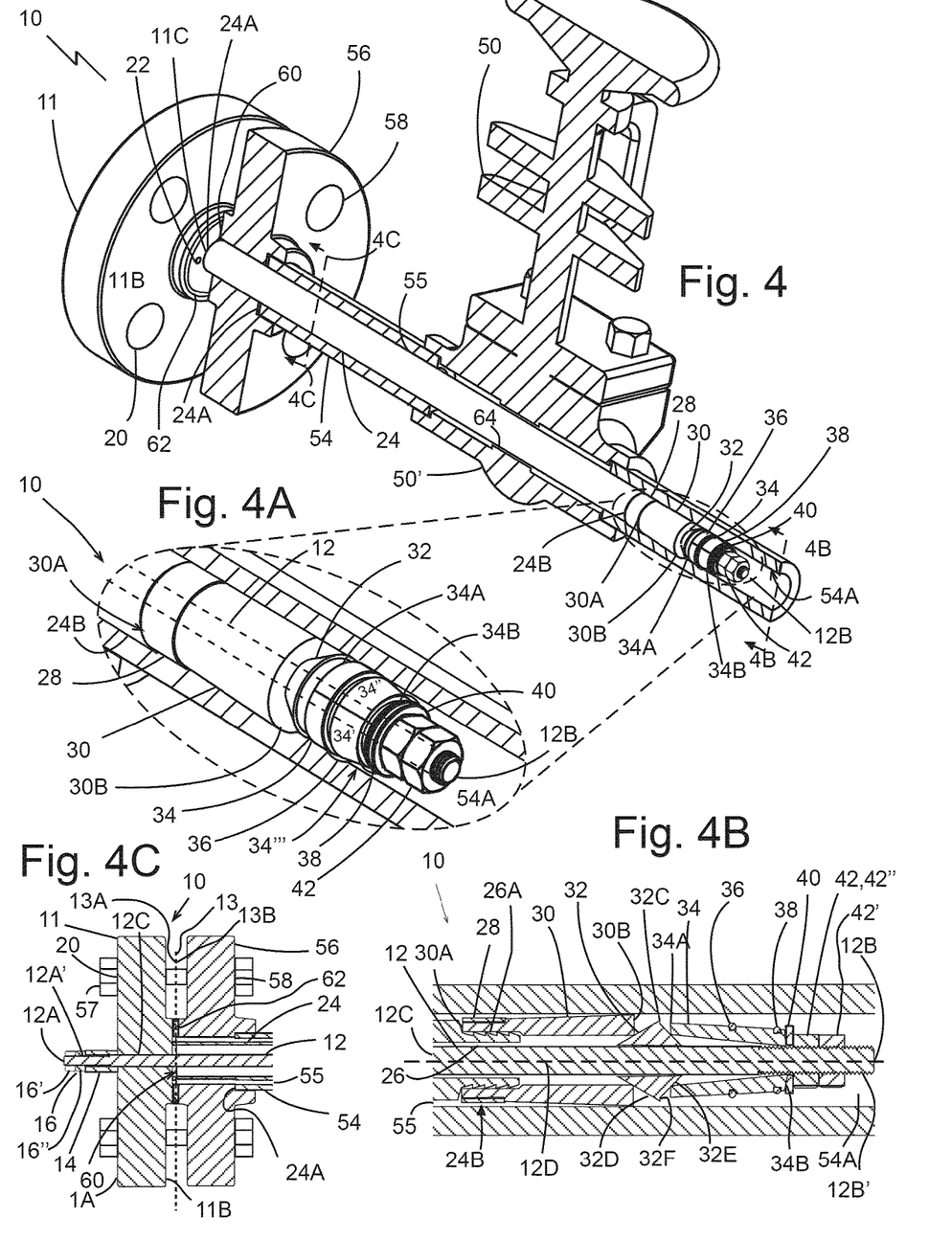
FIG. 4 is a perspective view of the weld test plug of FIG. 1 located in an unexpanded position in a valve, with part of the valve cutaway to illustrate the orientation of the parts of the weld test plug.
FIG. 4A is a close up view of the area denoted by reference character 4A in FIG. 4.
FIG. 4B is a section view taken along the 4B-4B section lines of FIG. 4.
FIG. 4C is a section view taken along the 4C-4C section lines of FIG. 4.
Figures 5, 5A, 5B, 5C:
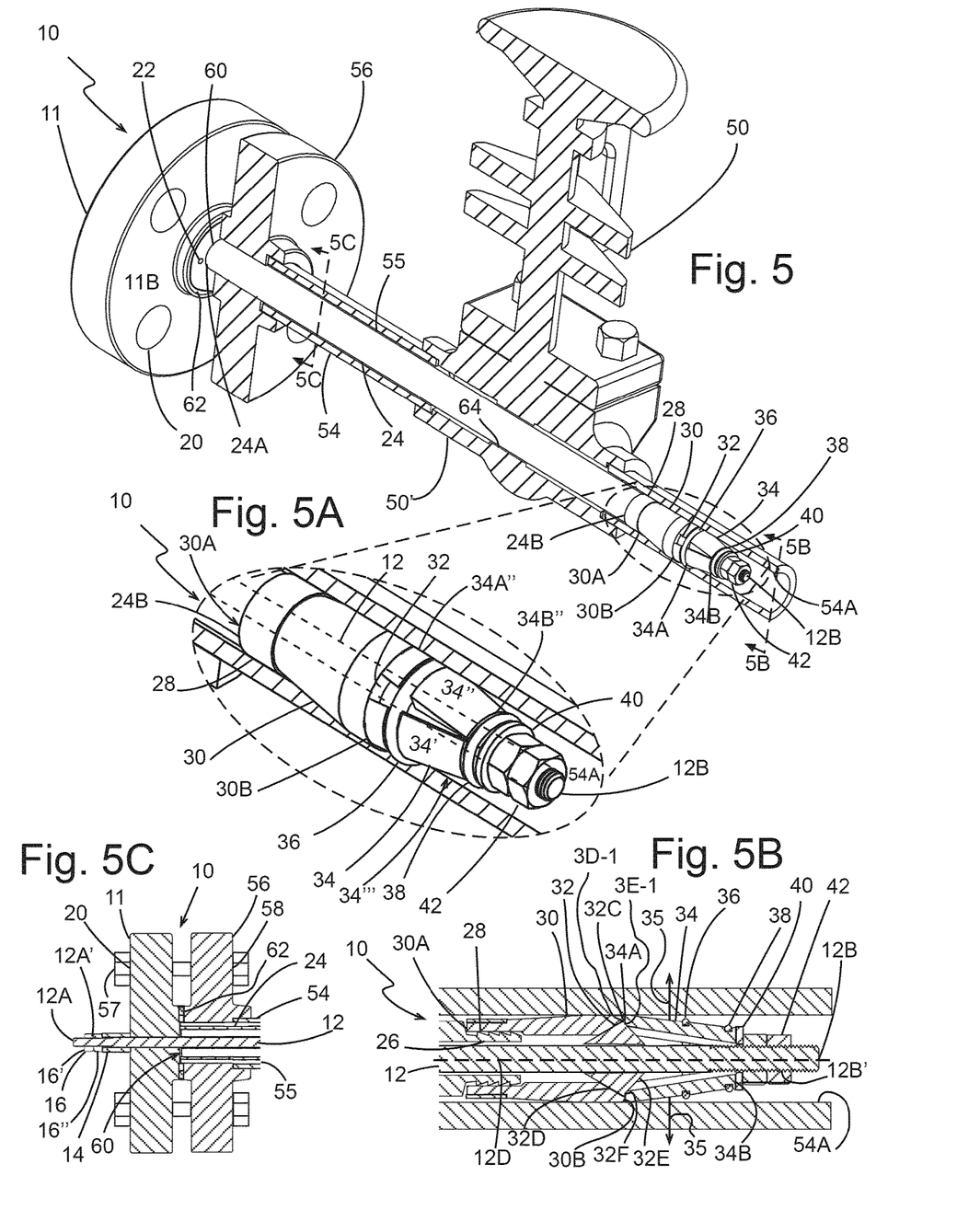
FIG. 5 is a perspective view of the weld test plug of FIG. 1 located in an expanded, sealed position in a valve, with part of the valve cutaway to illustrate the orientation of the parts of the weld test plug.
FIG. 5A is a close up view of the area denoted by reference character 5A in FIG. 5.
FIG. 5B is a section view taken along the 5B-5B section lines of FIG. 5.
FIG. 5C is a section view taken along the 5C-5C section lines of FIG. 5.

Varying internal diameter along the section of vessel through the plug travels during use adds a layer of complexity to be addressed in designing a suitable plug. For example weld projections, such as a weld root formed by excess weld material, may reduce inner diameter at axial points along the inner periphery of the vessel. Also, various fittings or other parts along the section may have different diameters from other parts sized for the same piping, for example some parts may have relatively greater wall-thickness than others to account for local-stress intensifications inherent to the geometry of the fitting. Referring to FIG. 4 or 5, some valves may also have reduced inner diameters, forming potential restrictions 64 through which a suitable seal must pass to reach its destination. A restriction 64 may be formed by a component of the valve such as a gate receiver seat or other valve member receiver. Within vessels with relatively small diameters, for example, a 1" pipe with an inner diameter of 24.3 mm, the proportional expansion that a suitable seal must undergo to properly function (pass through the section, expand, contract, and be retrieved from the section) may be greater than in the case of relatively larger diameter vessels.

Figure 1:
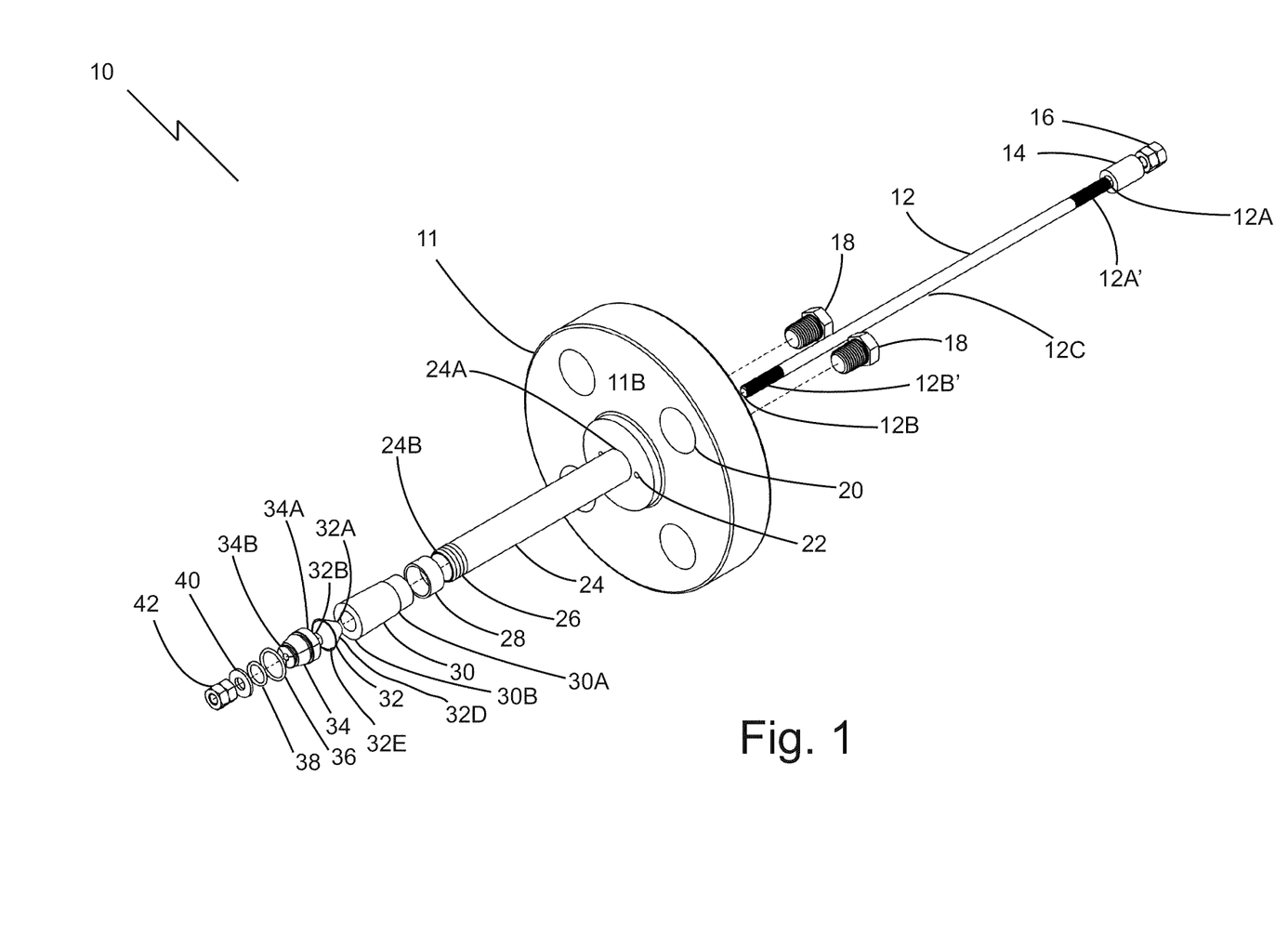
FIG. 1 is an exploded perspective view of a weld test plug.
Figure 2:
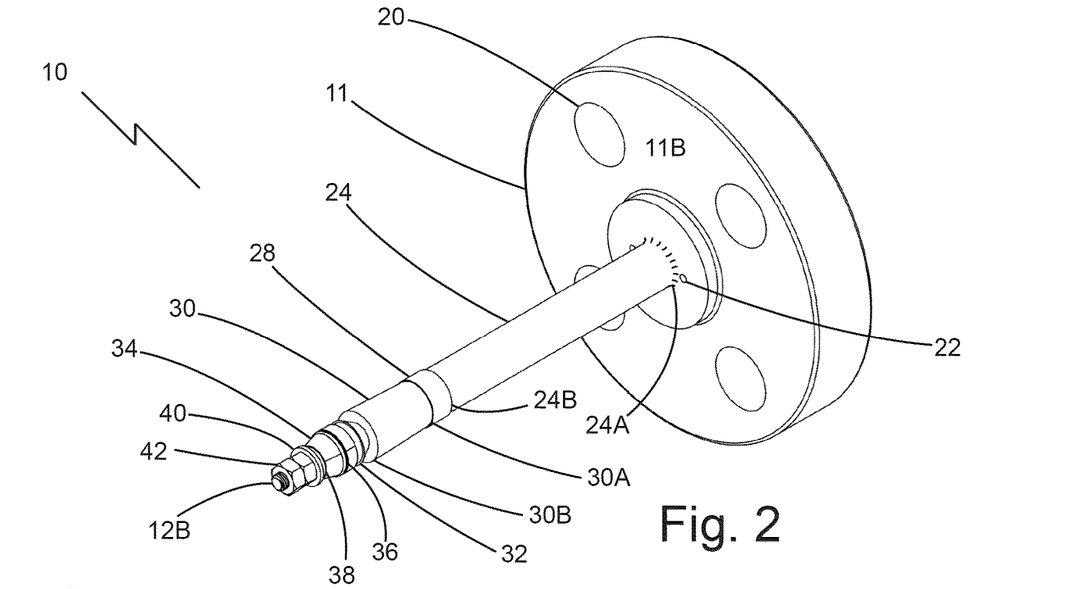
FIG. 2 is a perspective view of a testing end of the weld test plug of FIG. 1.

Referring to FIGS. 1-4, a weld test plug 10 is illustrated that may be inserted into an open end 60 of a vessel 54 (vessel 54 shown in FIG. 4 only), such as a pipe, to be used for conducting pressure testing and inspection. Referring to FIGS. 1 and 2, a weld test weld test plug 10 is illustrated comprising an actuator rod 12, an annular seal 30, a part expander 32, and an axial stop 34. The seal 30, expander 32, and stop 34 may be mounted on, for example carried by as shown, or otherwise provided as part of the actuator rod 12.

Referring to FIGS. 1, 4B and 4C, actuator rod 12 may have an elongate body 12C extended between a pair of opposed axial ends of the rod 12, such as ends 12A and 12B.

Referring to FIG. 4, in use the test plug 10 may in use be sealed to an open end 60 of a vessel 54 by a suitable mechanism. The plug 10 may be sealed with the vessel 54 at two points to isolate and define a test section 55 of the vessel 54. On the operator side of the plug 10, the plug 10 may seal to the vessel 54 by a flange-to-flange connection. For example, vessel 54 may have a flange 56 on open end 60, and test plug 10 may have a corresponding flange, such as a service flange 11, which may seal against flange 56 during use and may function as a blind flange. Flange 11 may define an operator face 11A and a vessel face 11B, referring to the orientation of the faces. Referring to FIGS. 4 and 4C, an array of bolt holes 20 (FIG. 4) may extend in axial directions between the faces 11A and 11B, with the holes 20 being positioned to in use align with a corresponding array of bolt holes 58 (FIG. 4) on a pipe-flange 56 of a vessel 54. Holes 20 and 58 may in use receive bolts 57 (FIG. 4C only) or other suitable fasteners to seal the flanges 56 and 11 together. Referring to FIG. 4 vessel face 11B may confront and form a seal with corresponding pipe-flange 56. Referring to FIG. 2, an operator face 11A may in use be accessible by an operator. Referring to FIG. 4, service flange 11 may define a central passage 11C through which may extend an actuator, such as actuator rod 12, so that the rod end 12B extends past the service flange vessel face 11B into vessel 54. The rod end 12A of rod 12 may be accessible on the operator face 11A of service flange 11. In other cases open end 60 may seal with plug 10 via a suitable mechanism other than a flange-to-flange connection such as by welding, cam-lock, threading, or adhesive.

Further referring to FIGS. 4-5, seal 30 and flange 11 may cooperate to isolate a section 55 of the vessel 54. Annular seal 30 may be positioned on test plug 10 so that when test plug 10 is inserted into an open end 60 of a vessel 54, annular seal 30 is positioned in spaced relation to end 60 through vessel 54 to define section 55 of pipe. Annular seal 30 may, when in use, be expanded radially to form a fluid tight seal with the inner circumferential surface 54A of a vessel 54 isolating section 55 from seal 30 to pipe end 60, which in use may be abutted and sealed with service flange 11.

Referring to FIGS. 4B and 5B, the actuator rod 12 may be connected to, during use, cause the part expander 32 to actuate the axial stop 34 to move radially outward. Rod 12 may carry the axial stop 34, the part expander 32, and the annular seal 30, for example in the order illustrated or in another suitable order. In the example shown stop 34, expander 32, and seal 30 may be mounted at or near rod test end 12B of rod 12. Referring to FIGS. 4B and 5B, upon actuation axial stop 34 may be moved in a radially outward direction, such as in directions 35, which may be perpendicular to rod axis 12D, and in some cases stop 34 may be radially expanded about a circumference of the stop 34. In the example shown, axial stop 34 expands radially until stop 34 contacts the inner circumferential surface 54A of the vessel 54.

Referring to FIGS. 4B and 5B, the actuator rod 12 may be connected to, during use, cause the part expander 32 to actuate the annular seal 30 to radially expand to seal against inner surface 54A of vessel 54. The seal 30 may be actuated to expand (FIG. 5B) and contract (FIG. 4B) to seal and unseal, respectively, against the inner surface 54A of vessel 54. Annular seal 30 may comprise an elastomeric material capable of retuning to its initial shape and diameter after expansion. Part expander 32 may in use interact with the annular seal 30 so that the seal 30 expands and forms a water-tight seal with the inner periphery surface 54A of the vessel 54. Referring to FIG. 4, test plug 10 is illustrated in an inserted but unsealed positon as such may appear before actuation of seal 30 and stop 34 or after actuation of same has been reversed and such parts are contracted.

Referring to FIGS. 4A-B and 5A-5B, the axial stop 34 may in use cooperate with the annular seal 30 to improve the sealing characteristics or the contractibility of the seal 30. As above, during actuation both the seal 30 and stop 34 may radially outward. Annular seal 30 may have first and second axial ends 30A and 30B, respectively and stop 34 may have first and second axial ends 34A and 34B, respectively. During actuation end 30B of seal 30 may abut axial stop 34, for example end 34A of axial stop 34. Stop 34 may in use contact the inner surface 54A of the vessel 54, although in other cases the stop 34 may simply extend radially outward, relative to where the stop 34 is positioned in the contracted position, without contacting surface 54A. By abutting ends 30B and 34A, axial movement of the seal 30 is limited, which may improve the maximum radial expansion of the seal 30. Axial stop 34 may prevent the end 30B of seal 30 from axially crossing over a lip portion 32C, which may define an absolute or local maximum diameter of expander 32. Preventing seal 30 from crossing portion 32C may be advantageous to improve the contractibility of the seal 30 upon de-actuation, and also may improve the maximum sealing capacity of the seal 30. Testing has revealed higher maximum seal pressures across seal 30 with the use of axial stop 34 than without.

Referring to FIGS. 1, 4A, and 4B, part expander 32 may be structured to actuate one or both the stop 34 and seal 30 by relative translation (sliding). Expander 32 may have a first axial portion that is structured to slide relative to and within the annular seal 30 to radially expand the annular seal 30. One or both of the first axial portion and the seal 30 may be contoured to form a wedge that permits the first portion and seal 30 to slide relative to one another to radially expand the seal 30. In the example shown, the first axial portion forms a wedge, for example a first frustoconical wedge 32D, that is tapered with decreasing radius toward the annular seal 30, for example toward end 30B of seal 30. In other cases the seal 30 may be contoured, for example an inner circumferential surface may be tapered with increasing radius towards expander 32 (not shown), for example toward end 32B of expander 32. A frustoconical surface or wedge may have a hollow core (shown to receive rod 12) or a solid core, and may have a straight, curved, or other taper profile when viewed in cross-section taken along a plane parallel to and passing through axis 12D.

Referring to FIGS. 1, 4A, and 4B, part expander 32 may have a second axial portion that is structured to slide relative to and within the axial stop 34 to move the axial stop 34 in a radially outward direction 35 (FIG. 5B). One or both of the second axial portion and the stop 34 may be contoured to form a wedge that permits the second portion and the stop 34 to slide relative to one another to move the stop 34 radially outward, for example to radially expand the stop 34. In the example shown, the second axial portion forms a wedge, for example a second frustoconical wedge 32E, that is tapered with decreasing radius toward the axial stop 34, for example toward distal end 34B of stop 34. In other cases the stop 34 may be contoured, for example an inner circumferential surface of stop 34 may be tapered with increasing radius towards expander 32 (not shown), for example toward end 34A of stop 34.

Referring to FIGS. 4B and 5B axial stop 34 may comprise a collet. The collet may be formed by two or more collet fingers, such as fingers 34', 34", 34" '. Fingers 34'-34"' may be connected to pivot or bend from a common base, or may be disconnected or floating relative to one another as shown. Fingers 34'-34"' may be capable of supporting the expanded seal 30 adjacent the pipe inner surface 54A upon actuation. Collet fingers 34', 34", 34"' may in use interact with part expander 32 to move in radially outward directions 35 (FIG. 5B) relative to the rod 12.

Referring to FIGS. 4B and 5B, the collet fingers may be biased to radially contract during resetting of the weld test plug 10. Fingers 34', 34", 34"' may have mounted thereon at least one annular gasket, for example O-ring 36 and O-ring 38, capable of biasing the collet fingers 34', 34", 34' radially inward to assist in returning the stop 34 to its original diameter after expansion. Axial stop 34 may comprise metal material, or other rigid or resilient material. In some cases the stop 34 may be an annular stop, for example made of rubber, metal, or another suitable elastomeric or resilient material that is permitted to be radially expanded.

The part expander 32 may be structured to limit axial travel, relative to the part expander 32, of the axial stop 34 during actuation. Limiting the axial travel of the stop 34 may prevent the stop 34 from travelling over the lip portion 32C. Limiting axial travel may prevent the stop 34 from expanding or moving radially outward beyond a certain extent, for example to prevent inadvertent binding of the stop 34 with the vessel surface 54A. Referring to FIG. 5B, part expander 32 may be structured so that a base end 32D-1 of first frustoconical wedge 32D is adjacent to a base end 32E-1 of second frustoconical wedge 32E, the base ends referring to the largest diameter portions of each wedge, as opposed tip ends. The end 32D-1 may be wider than end 32E-1, for example as shown where a radius of the base end 32D-1 is greater than a radius of the base end 32E-1, thus defining a radially facing stop flange 32F, such as an annular surface as shown, between first frustoconical wedge 32D and second frustoconical wedge 32E. Stop flange 32F may in use interact with the axial stop 34 to restrict axial travel of stop 34 relative to the part expander 32.

Referring to FIGS. 1, 4B-C, and 5B-C, the rod 12 may actuate the part expander 32 by a suitable method such as one or more of translation and rotation. In some cases other methods may be used, or a combination of two or more methods. In the example shown the rod 12 is configured such that rotation of the rod 12 causes the expander 32 to translate (slide) relative to seal 30 and stop 34. Actuator rod 12 may be threaded at one or more locations along the rod body 12C, such as at threaded parts 12A' and 12B', which in the example are located at or near ends 12A and 12B, respectively. Referring to FIG. 4C, threaded segment or part 12A' may extend on and beyond operation face 11A of service flange 11. Similarly, referring to FIGS. 4B and C, the part 12B' may extend on and beyond vessel face 11B. Threaded part 12A' may carry a fastening element, for example a nut 16 or nuts 16', 16", which may comprise a turning nut 16" and a locking nut 16'. Nuts 16 may cooperate with a collar 14 in order to permit rotation of the actuator rod 12 to adjust the length of the actuator rod 12 as extended past the face 11B of flange 11. Referring to FIG. 4B, weld test plug 10 may comprise a fastening element, such as a nut 42 or nuts 42', 42", distally carried on the actuator rod 12 near the rod test end 12B. Nuts 42 may cooperate to pull washer 40 against end 34B of expander stop 34. In the example shown, expander 32 is mounted to float on rod 12, such that stop 34 is forced into contact with expander 32 to radially expand over the expander 32, and subsequently forcing expander 32 into seal 30. Referring to FIG. 4C, in some cases the flange 11 defines a sealing plane 13, defining an operator side 13A and a testing side 13B, with the rod extending on both sides 13A and 13B.

Referring to FIGS. 1, 4B, and 4C, test plug 10 may comprise a stand pipe or shaft 24 between the seal 30 and flange 11. An axial end 24A may abut service flange 11 and extend axially away from pipe face 11B to the annular seal 30. The axial end 24A may be mounted to the flange 11 via welding or another suitable method. Shaft 24 may extend concentric to and radially outward from actuator rod 12. The shaft 24 may provide an isolated volume in which the actuator rod 12 can operate properly. The shaft 24 may also be sized to reduce the volume of fluid required to fill and pressurize the section 55 of vessel 54. Thus, in some cases the shaft 24 has an outer diameter equal to or greater than the diameter of the seal 30 when in the contracted position. Reducing the volume of fluid required to fill and pressurize the section 55 of vessel 54 may be advantageous to reduce the negative effects of pressure and thus wear on the seal 30 and other internal components of plug 10.

Referring to FIG. 4B, shaft 24 may comprise a gripping part 26 at an end 24B that mounts the annular seal 30. Gripping part 26 may be configured to grip annular seal 30 by a suitable mechanism, for example, barbed or jagged ridges 26A. Test plug 10 may comprise a part such as a split ring or collar 28 mounted on, for example around an external surface of, the annular seal 30 at or near the end 30A of seal. Collar 28 may be mounted on the annular seal 30 to hold seal 30 in place against the shaft 24. In some cases the collar 28 may be secured to the seal 30, for example compressed against the seal 30, for further example by crimping, wire clamp, or other suitable mechanisms. Collar 28 may thus compress the seal 30 against the gripping part 26 or the shaft 24. The use of a gripping part 26 may improve the removability of the plug 10 from the vessel 54, by gripping the end 30A of the seal 30 and permitting the shaft 24 to be used to pull the seal 30. Thus, in the event that the seal 30 becomes deformed or otherwise does not contract sufficiently to clear the minimum inner diameter of the vessel 54, the gripping part 26 provides a friction grip to permit the operator to use force to attempt to pull and squeeze the seal 30 out of the vessel 54.

Figure 3:
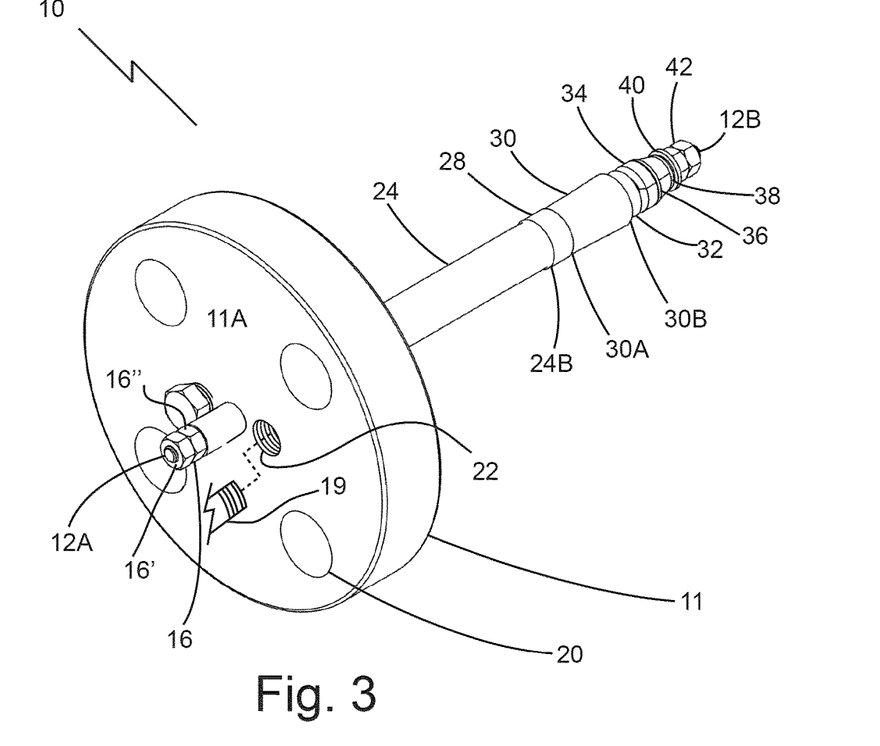
FIG. 3 is a perspective view of an operator end of the weld test plug of FIG. 1.

Referring to FIGS. 1, 3, and 5, service flange 11 may comprise a fluid port 22. Port 22 may be provided through which a testing medium, such as water, glycol, oil or other suitable fluid, may be passed into a section 55 of vessel 54 extending between an expanded end of the annular seal 30 and the service flange face 11B. One or more fluid supply or returns, such as a hose fitting 19, may be connected to the flange 11, for example via connection to port 22. Fitting 19 may be threaded into ports 22 during use to deliver or remove test fluid or undesirable residual fluids such as system gas. A fluid nipple or other suitable fluid supply or return device may be connected to supply or return either or both of ports 22. A fitting may comprise a check valve to prevent flow back. Bolts 18 may be used to seal the ports 22 during times of non-use. Ports 22 may be located to be in fluid communication with section 55 once isolated within vessel 54.

Referring to FIG. 4, a method of hydrotesting a vessel 54 may be carried out using a suitable series of steps. Referring to FIGS. 2 and 4, an actuator rod 12 of a weld test plug 10 may be inserted within a vessel 54, such as a pipe conduit with a valve 50. In some cases the valve 50 is part of a repair or upgrade to a fluid system at a facility, such as forming part of a steam trap. The valve 50 illustrated is a gate valve that is used to upgrade a fluid circuit to permit periodic isolation of a portion of the circuit, by modifying the circuit to replace a section of pipe with valve 50. The valve 50 or other fitting may be connected within the circuit, for example via welding. The plug 10 may thus be used to isolate the section of vessel 54 that has been connected, in this case the valve 50, in order to pressure test the welded connection.

Prior to insertion of the rod 12, the axial length of the rod 12 may be selected or adjusted to ensure that once inserted, the seal 30 is positioned at a suitable location to isolate the connection to be tested. Ensuring the correct length of rod 12 may involve selecting a suitably sized rod 12 from a series of rods 12 of different lengths, by adjusting the length of the rod 12 itself in the case of a telescopic or other length-adjustable rod 12, or adjusting an axial sealing position of the seal 30 on the rod 12, for example by adjusting the axial position of the nuts 42 on end 12B or rod 12. The nuts 42 may form double locking nuts to prevent inadvertent unthreading of one of the nuts 42 during operation, such as under fluid pressure from testing. The length of shaft 24 may also be adjustable in the same fashion as the rod 12.

Referring to FIGS. 4 and 4C, once the actuator rod 12 is inserted within the open end 60 of the vessel 54, the open end 60 may be sealed. The open end 60 may be sealed, for example by sealing flanges 11 and 56 together by securing and tightening bolts 57 through aligned holes 20 and 58 in flanges 11 and 56, respectively. Flanges 11 and 56 thus abut one another along sealing plane 13, for example by direct contact or indirectly through an intermediate component such as a gasket 62 positioned between the flanges 11 and 56. The gasket 62 may be a suitable sealing member such as an O-ring or a spiral wound gasket, and may be located in a corresponding slot (not shown) on one or both flanges.

Before, during, or after the seal 30 is actuated to seal the vessel 54, the section 55 may be filled with test fluid, for example water, methanol, glycol, or another suitable fluid. In some cases fluid injection may be carried out prior to setting the seal 30, in order to remove gas bubbles. For example, if the section 55 is vertical, then fluid may need to be pumped through to remove the gas bubbles. In cases where the section 55 is horizontal, the same procedure may be carried out but may not be necessary if the structure of the section 55 and vessel 54 is such that fluid injection clears all bubbles or other unwanted residual fluids. The ports 22 may be used in flange 11 to inject test fluid or to remove undesirable fluids as may be the case. The precise mode of filling with test fluid may be dictated by system design and gravity. For example, if the ports 22 occupy the highest point in the system, then the ports 22 may be used to bleed off air bubbles. By contrast, if such are the lowest point or an intermediate point in the system, such may be used to fill the system. The purpose of the filling step is to displace all system fluids in the section 55 with test fluid.

Referring to FIGS. 5, and 5A-C, the actuator rod 12 may be operated to actuate the stop 34 and seal 30. Actuation may be carried out to seal the seal 30 at the sealing location shown. Actuation may be carried out before, during, or after the flanges are sealed together. To actuate the seal 30, the user may turn the turning nut 16' to incrementally begin to draw the rod 12 out of the passage 11C to reduce the axial length of rod 12 on the vessel side 13B of the sealing plane 13 (FIG. 4C). The washer 40 contacts the stop 34, and draws the stop 34 up the wedge 32E to radially expand the stop 34. The stop 34, in this case collet fingers 34', 34", and 34''' contact the stop flange 32F, and the expander 32 then begins to move as one with the stop 34 toward the seal 30. The wedge 32D begins to advance within the seal 30, spreading the seal 30. The end 30B of the seal contacts the splayed end 34A of stop 34, and is directed further radially outward toward and into engagement with surface 54A of vessel 54. The rod 12 may be rotated to a sufficient predetermined extent or torque, and not beyond to avoid damaging the seal 30 by overtorquing same. A torque wrench may be used, such as a digital torque wrench that can be set to a maximum range of torque, for example within 1 foot pound of torque of a predetermined maximum torque value. The double locking nut 16" may then be turned to engage the collar 14 or flange 11 to lock the rod 12 in the present extension.

Referring to FIGS. 5 and 5A-C, once the section 55 is filled with fluid and sealed at open end 60 and hydro seal 30, the fluid may be pressurized to the extent desired to carry out the hydro testing. Fluid may be held under pressure with section 55 for a predetermined length of time, for example as required to complete the test. Testing pressure and hold time may be set depending on the nature of the system and the section 55. In some cases pressures of up to 2100 psi, 4600 psi, or higher are used. During the hold time, for example 10 minutes or more or less, and the pressurization stage, the operator may monitor the exterior of the section 55 for leaks, and may monitor for leaks using other suitable mechanisms.

Once the pressurization and hold stage are complete, the system is depressurized and seal 30 released. To release the seal 30 a suitable method may be carried out such as reversing the steps carried out to actuate the seal 30. Referring to FIGS. 5, and 5A-C, the locking nut 16" may be released from contact with collar 14, and the turning nut 16' rotated to retract the rod 12 back into the system. With the compressive force on the seal 30 and stop 34 releasing, the O-rings 36 and 38 compress the stop 34 down the wedge 32E and back into the contracted state, while the wedge 32D retreats and exits end 30B of seal 30 to permit the seal 30 to contract back to its original contracted shape pre-actuation. Ports 22 or other outlets may be used to clear test fluid from the system if any such remains. Referring to FIGS. 4, and 4A-C, bolts 57 are removed and flanges 11 and 56 are separated, withdrawing the rod 12 and associated parts from within the vessel 54. The flange 56 may then be connected back into the fluid system or vessel 54 for further testing or use.

If the seal 30 has been deformed and does not return to its contracted position, then application of a pulling force on seal 30 through shaft 24 acts to pull the seal 30 out of the restriction in the section 55 by virtue of the gripping strength of the gripping part 26 of shaft 24. If the seal 30 is damaged, such may be replaced by removing or releasing the collar 28, removing or cutting off the damaged seal 30, installing a new seal 30, and re-securing the seal 30 with collar 28.

The disclosed methods may be used to test valves, pipes, and other vessels in numerous applications. In some cases the testing may occur on oil and gas facilities, such as refineries. Steam stations or traps may be services, for example by testing the steal and condensate lines in such traps. The seal 30 may be made of a suitable material, such as rubber or urethane. The stop 34 may be made of a suitable material, such as aluminum. The plugs 10 may permit use over a variety of sections 55 of fluid systems, for example within piping from half to two inches in outer diameter with standard interior diameters, or greater or smaller diameter systems, in various schedules. The seal 30 may radially expand by 30% or more in diameter, for example to permit passage through a 0.71 mm ID (inner diameter) restriction and subsequent sealing to a 0.91 mm (ID) section of pipe.

Seal expansion may be reversible back to an initial contracted state. The seal 30 and plug 10 may be reused. In some cases the disclosed apparatuses and methods reduce or eliminate a need for closure welds.

The order of parts on rod 12 may be modified, for example reversed so the seal 30 was at the end of the rod. In such a case the rod 12 may need to be translated to increase the axial length of the rod 12 in the vessel 55. The rod 12 may be a sleeve. Parts may connect directly or indirectly via other parts. Actuation may be achieved by remote electronic, pneumatic, or pressure methods, for example fluid pressure may actuate the seal 30.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A weld test plug comprising:
    a flange;
    an actuator rod mounted to the flange, the actuator rod having:
        a part expander;
        an annular seal; and
        an axial stop;
    in which the actuator rod is connected to, during use, cause the part expander to actuate:
        the axial stop to move in a radially outward direction relative to the actuator rod;
        the annular seal to radially expand and abut the axial stop; and
    in which the part expander has a first axial portion that is structured to slide relative to and within the annular seal to radially expand the annular seal.

2. The weld test plug of claim 1 in which the first axial portion forms a wedge that is tapered with decreasing radius in a direction toward the annular seal, and in which the first axial portion is frustoconical in shape.

3. The weld test plug of claim 1 in which the part expander has a second axial portion that is structured to slide relative to and within the axial stop to move the axial stop in the radially outward direction.

4. The weld test plug of claim 3 in which the second axial portion is tapered with decreasing radius in a direction toward the axial stop.

5. The weld test plug of claim 4 in which the part expander defines a stop flange that limits axial travel, relative to the part expander, of the axial stop during actuation.

6. The weld test plug of claim 1 in which the axial stop is structured to radially expand during actuation.

7. The weld test plug of claim 1 in which the axial stop comprises collet fingers.

8. The weld test plug of claim 7 in which the collet fingers are biased to radially contract during resetting of the weld test plug, and further comprising an annular gasket mounted to radially contract the collet fingers.

9. The weld test plug of claim 1 in which:
    the annular seal defines a first end and a second end opposed to the first end;
    the annular seal is mounted such that during actuation the first end abuts the axial stop;
    the second end is mounted to a shaft that extends between the flange and the annular seal, with the actuator rod located within the shaft; and
    the shaft defines a gripping part that grips the second end of the annular seal.

10. The weld test plug of claim 1 in which:
    the flange defines a seal plane with a first side and a second side;
    an operator end of the actuator rod is on the first side;
    the part expander, the annular seal, the axial stop, and a testing end of the actuator rod are on the second side; and
    the actuator rod is threaded to the flange or to a part located on the first side in order to permit rotation of the actuator rod to adjust an axial length of the actuator rod on the second side.

11. An annular seal for a weld test plug, the annular seal comprising:
    a first axial end and a second axial end, the first axial end defining a hollow shaft mount for mounting to a hollow shaft of the weld test plug in use, the second end defining an axial stop abutting surface for abutting an axial stop of the weld test plug in use, the annular seal defining a seal expander receiving bore between the first axial end and the second axial end for contacting a seal expander of the weld test plug in use;
    in which the annular seal is structured to be actuated by the seal expander in use to move between:
        an expanded, sealing position where the annular seal is radially expanded to fluidly seal against an inner circumferential surface of a vessel, while the axial stop abutting surface abuts an axial stop, in use; and
        a contracted, unsealed position where the annular seal is radially contracted to unseal from the inner circumferential surface of the vessel in use,
    in which annular seal comprises elastomeric material that returns to its initial shape after moving from the expanded, sealing position to the contracted, unsealed position.

12. A combination comprising the annular seal of claim 11, a hollow shaft, and a seal compressor part, in which the hollow shaft mounts to an interior surface of the annular seal at a first axial end of the annular seal, and the seal compressor part mounts around an external surface of the first axial end to compress the annular seal against the hollow shaft.

13. A combination comprising the annular seal of claim 11, a seal expander, and an axial stop, with the axial stop abutting surface of the annular seal abutting the axial stop, and the seal expander wedged within the seal expander receiving bore.

14. The combination of claim 13 further comprising:
    a hollow shaft, with the second axial end mounting to the hollow shaft; and
    an elongate body extended within the hollow shaft, through the seal expander receiving bore to mount the axial stop, and structured to actuate the axial stop and seal expander to move the annular seal between the expanded, sealing position and the contracted, unsealed position.

15. The weld test plug of claim 14 in which the hollow shaft defines a gripping part that grips the second axial end of the annular seal.

16. A weld test plug comprising:
    a flange;
    an actuator rod mounted to the flange, the actuator rod having:
        a part expander;
        an annular seal; and
        an axial stop;

in which the actuator rod is connected to, during use, cause the part expander to actuate:
the axial stop to move in a radially outward direction relative to the actuator rod; and
the annular seal to radially expand and abut the axial stop;
in which the part expander has an axial portion that is structured to slide relative to and within the axial stop to move the axial stop in the radially outward direction;
in which the axial portion is tapered with decreasing radius in a direction toward the axial stop; and
in which the part expander defines a stop flange that limits axial travel, relative to the part expander, of the axial stop during actuation.

17. The weld test plug of claim 16 in which the axial portion is a section axial portion, and the part expander has a first axial portion that is structured to slide relative to and within the annular seal to radially expand the annular seal.

18. The weld test plug of claim 17 in which the first axial portion forms a wedge that is tapered with decreasing radius in a direction toward the annular seal, and in which the first axial portion is frustoconical in shape.

19. The weld test plug of claim 17 in which:
the annular seal defines a first end and a second end opposed to the first end;
the annular seal is mounted such that during actuation the first end abuts the axial stop;
the second end is mounted to a shaft that extends between the flange and the annular seal, with the actuator rod located within the shaft; and
the shaft defines a gripping part that grips the second end of the annular seal.

20. A weld test plug comprising:
a flange;
an actuator rod mounted to the flange, the actuator rod having:
a part expander;
an annular seal; and
an axial stop;
in which the actuator rod is connected to, during use, cause the part expander to actuate:
the axial stop to move in a radially outward direction relative to the actuator rod; and
the annular seal to radially expand and abut the axial stop;
in which the axial stop comprises collet fingers.

21. A weld test plug comprising:
a flange;
an actuator rod mounted to the flange, the actuator rod having:
a part expander;
an annular seal; and
an axial stop;
in which the actuator rod is connected to, during use, cause the part expander to actuate:
the axial stop to move in a radially outward direction relative to the actuator rod; and
the annular seal to radially expand and abut the axial stop;
in which:
the annular seal defines a first end and a second end opposed to the first end;
the annular seal is mounted such that during actuation the first end abuts the axial stop;
the second end is mounted to a shaft that extends between the flange and the annular seal, with the actuator rod located within the shaft; and
the shaft defines a gripping part that grips the second end of the annular seal.

22. A method comprising:
inserting an actuator rod into an open end of a vessel, the actuator rod carrying an annular seal, and an axial stop;
sealing the open end of the vessel around the actuator rod;
operating the actuator rod to actuate:
the axial stop to move in a radially outward direction relative to the actuator rod;
the annular seal to radially expand to abut the axial stop and seal against an inner circumferential surface of the vessel; and
pressurizing fluid within a test zone defined within the vessel between the annular seal and the open end of the vessel.

23. The method of claim 22 further comprising, after pressurizing, operating the actuator rod to actuate the annular seal to radially contract and unseal from the inner circumferential surface of the vessel.

24. The method of claim 23 further comprising, after pressurizing, operating the actuator rod to actuate the axial stop and seal to radially contract.

25. The method of claim 22 further comprising:
removing the annular seal from the actuator rod; and
installing a new annular seal on the actuator rod.

* * * * *